United States Patent
Matsumoto

(10) Patent No.: US 12,395,310 B2
(45) Date of Patent: Aug. 19, 2025

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Hitoshi Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 538 days.

(21) Appl. No.: 17/814,482

(22) Filed: Jul. 22, 2022

(65) Prior Publication Data

US 2023/0032204 A1 Feb. 2, 2023

(30) Foreign Application Priority Data

Jul. 29, 2021 (JP) .................... 2021-124343

(51) Int. Cl.
H04L 7/00 (2006.01)
H04J 3/06 (2006.01)

(52) U.S. Cl.
CPC .......... *H04L 7/0041* (2013.01); *H04J 3/0667* (2013.01)

(58) Field of Classification Search
CPC .............................. H04L 7/0041; H04J 3/0667
See application file for complete search history.

(56) References Cited

U.S. PATENT DOCUMENTS

| | | | | |
|---|---|---|---|---|
| 8,571,068 B2* | 10/2013 | Fourcand | ............. | H04J 3/0667 370/498 |
| 9,054,967 B1* | 6/2015 | Edsall | ................... | H04L 43/106 |
| 9,282,024 B2* | 3/2016 | Branscomb | ............. | H04L 45/00 |
| 9,306,693 B2* | 4/2016 | Tzeng | ................... | H04J 3/0661 |
| 10,404,552 B2* | 9/2019 | Holmeide | ............... | H04L 43/12 |
| 11,706,152 B2* | 7/2023 | Chandrasekaran | ... | H04L 47/562 370/413 |
| 2010/0125661 A1* | 5/2010 | Perala | .................... | H04L 43/106 709/224 |
| 2012/0039194 A1* | 2/2012 | Kure | .................... | H04N 21/6437 375/259 |
| 2013/0114601 A1* | 5/2013 | Branscomb | ........... | H04J 3/0697 370/392 |
| 2014/0177653 A1* | 6/2014 | Tzeng | ................... | H04J 3/0635 370/503 |
| 2015/0156261 A1* | 6/2015 | Blake | ...................... | H04L 69/28 709/248 |
| 2020/0344333 A1* | 10/2020 | Hawari | ................. | H04J 3/0667 |

FOREIGN PATENT DOCUMENTS

JP 2005242718 A 9/2005

* cited by examiner

*Primary Examiner* — Bailor C Hsu
(74) *Attorney, Agent, or Firm* — Canon U.S.A., Inc. IP Division

(57) ABSTRACT

A communication apparatus includes a requester unit configured to issue a request for transmission of a packet, a transfer unit configured to transfer the packet based on the request, a transmission unit configured to transmit the packet transferred by the transfer unit and to output a timestamp based on the transmission of the packet, and a control unit configured to control output of a tag associating the packet with the timestamp based on predetermined information that is read from an interface between the transfer unit and the transmission unit.

8 Claims, 10 Drawing Sheets

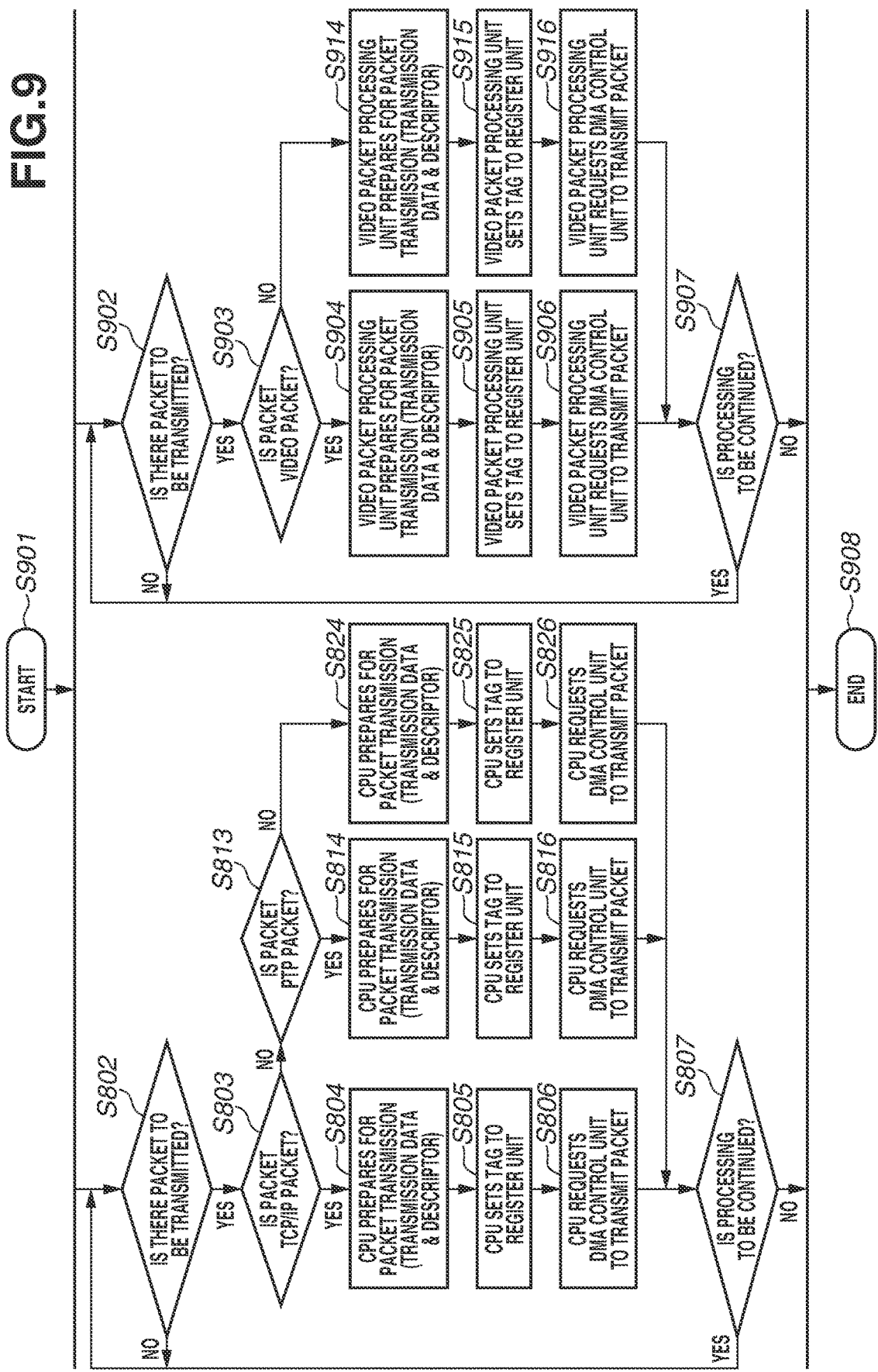

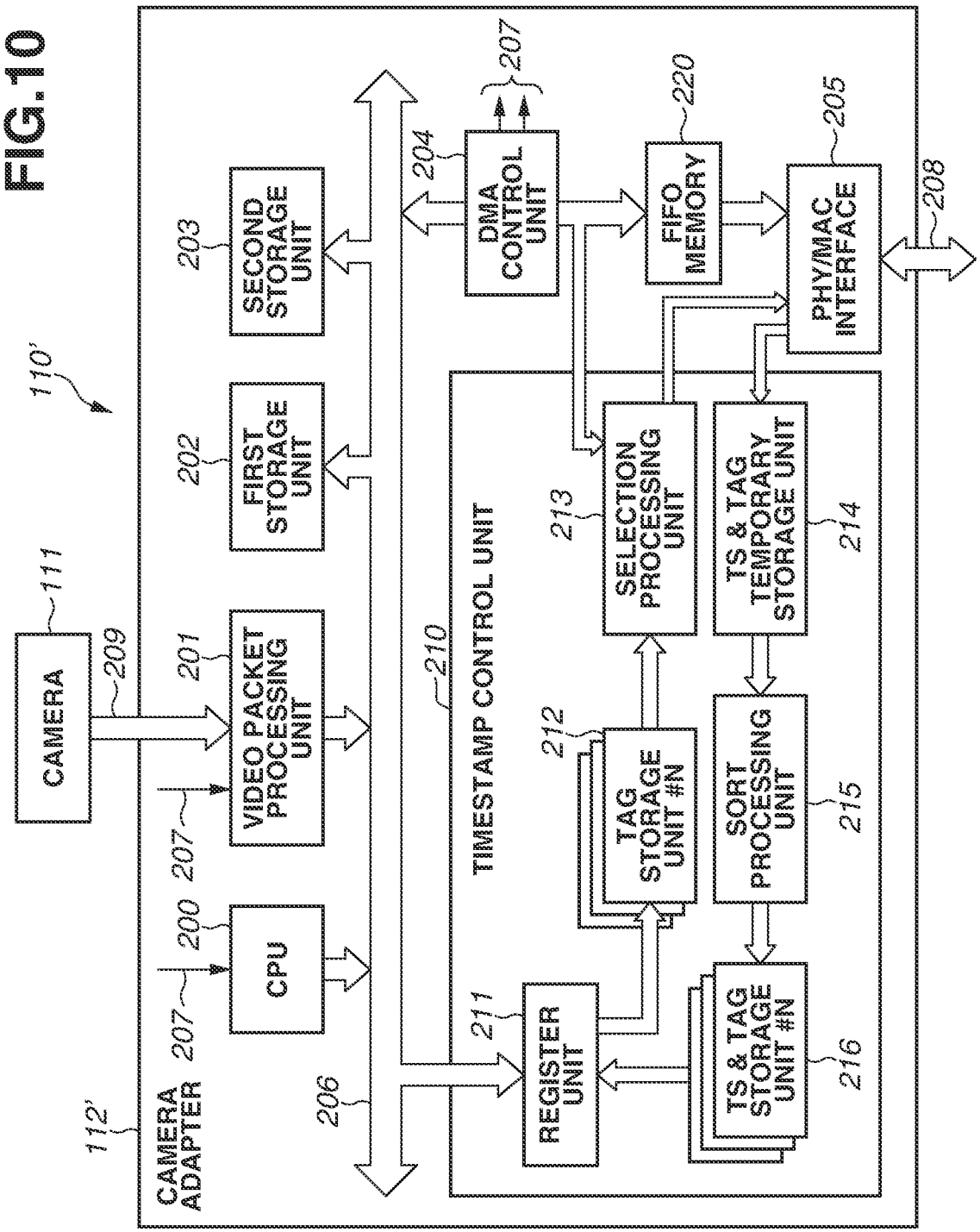

COMMUNICATION APPARATUS, COMMUNICATION METHOD, AND STORAGE MEDIUM

BACKGROUND

Field of the Disclosure

The present disclosure elates to a communication apparatus, a communication method, and a storage medium.

Description of the Related Art

Techniques for capturing images from a plurality of viewpoints by synchronous imaging with a plurality of cameras at different positions and generating virtual viewpoint content using the images from the plurality of viewpoints that are captured by the synchronous imaging have attracted attention. With the virtual viewpoint content, for example, a viewer can view a highlight scene of a soccer or basketball game from various angles. This gives highly realistic sensations to the viewer compared to normal images.

Precision Time Protocol (PTP) is a method for synchronization using a network to realize synchronous imaging. According to PTP, a leader device that generates an accurate time transmits a PTP packet with information about the time appended thereto, and a follower device receives the PIP packet to synchronize the time.

There is a daisy-chain connection method of connecting communication apparatuses together in a linear series as a method for connecting a plurality of communication apparatuses that forms a network. Each communication apparatus includes a plurality of connectors and, connects to other communication apparatuses via different connectors to establish a daisy-chain connection.

Various communication packets are transferred within the communication network where the communication apparatuses are daisy-chained. Examples of communication packets are PTP packets for time synchronization between communication apparatuses or between a leader device and a communication apparatus, Transmission Control Protocol over Internet Protocol (TCP/IP) packets for controlling communication apparatuses, and image/video packets of images/videos captured by cameras.

The communication packets are transferred based on transmission order control by a direct memory access controller (DMAC). At this time, a requester transmits a transfer request to the DMAC so that a communication packet is transferred to a Media Access Control (MAC)/Physical Layer (PHY) interface. Then, in a case where the MAC/PHY interface supports hardware timestamp output, a timestamp of the communication packet is output with a significantly high synchronization accuracy of microsecond or less. In a case where a hardware timestamp is to be output, identification information referred to as a tag is generally set to the PHY/MAC interface. The tag associates the communication packet with the timestamp to be output.

Japanese Patent Application Laid-Open No. 2005-242718 discusses a method for transferring communication packets using a DMAC. According to the method discussed in Japanese Patent Application Laid-Open No. 2005-242718, in a case where a plurality of requesters as a data transmission destination issues a transmission request to the DMAC, a priority order is set according to data size, and data transfer arbitration is performed based on the priority order. The transfer of small-size data is prioritized over the transfer of large-size data. When the transfer of small-size data is not performed, the transfer of large-size data is prioritized.

However, in the direct memory access (DMA) transfer discussed in Japanese Patent Application Laid-Open No. 2005-242718, an order of data to be transferred by the DMAC and an order of transmission requests from requesters may become different from each other as a result of the arbitration, and data may not be transferred in the order of transmission requests from the requesters. In this case, each requester cannot set an appropriate tag to a PHY/MAC interface because the order of data transfer is unknown, and a timestamp output from the PHY/MAC interface cannot be associated with a communication packet that is requested to be transmitted by the requester.

SUMMARY

The present disclosure is directed to providing a solution for appropriately associating a times amp with a packet.

According to an aspect of the present disclosure, a communication apparatus includes a requester unit configured to issue a request for transmission of a packet, a transfer unit configured to transfer the packet based on the request, a transmission unit configured to transmit the packet transferred by the transfer unit and to output a timestamp based on the transmission of the packet, and a control unit configured to control output of a tag associating the packet with the timestamp based on predetermined information that is read from an interface between the transfer unit and the transmission unit.

Further features of the present disclosure will become apparent from the following description of exemplary embodiments with reference to the attached drawings.

BRIEF DESCRIPTION OF THE DRAWINGS

FIG. 9 is a flowchart illustrating a process of requesting packet transmission according to one or more aspect of the present disclosure.

FIG. 10 is a block diagram illustrating an example of a configuration of a camera adapter according to one or more aspect of the present disclosure.

DESCRIPTION OF THE EMBODIMENTS

Various exemplary embodiments of the present disclosure will be described in detail below with reference to the attached drawings. It should be noted that the following exemplary embodiments are not intended to limit the present disclosure and that not all combinations of features described in the exemplary embodiments are always essential to a technical solution of the present disclosure. Each configuration according to the exemplary embodiments can be modified or changed appropriately for a specification of an apparatus to which the present disclosure is applied and for various conditions fuse conditions, use environments). The technical scope of the present disclosure is defined by the claims and is not limited by individual exemplary embodiments described below.

Figure 1:
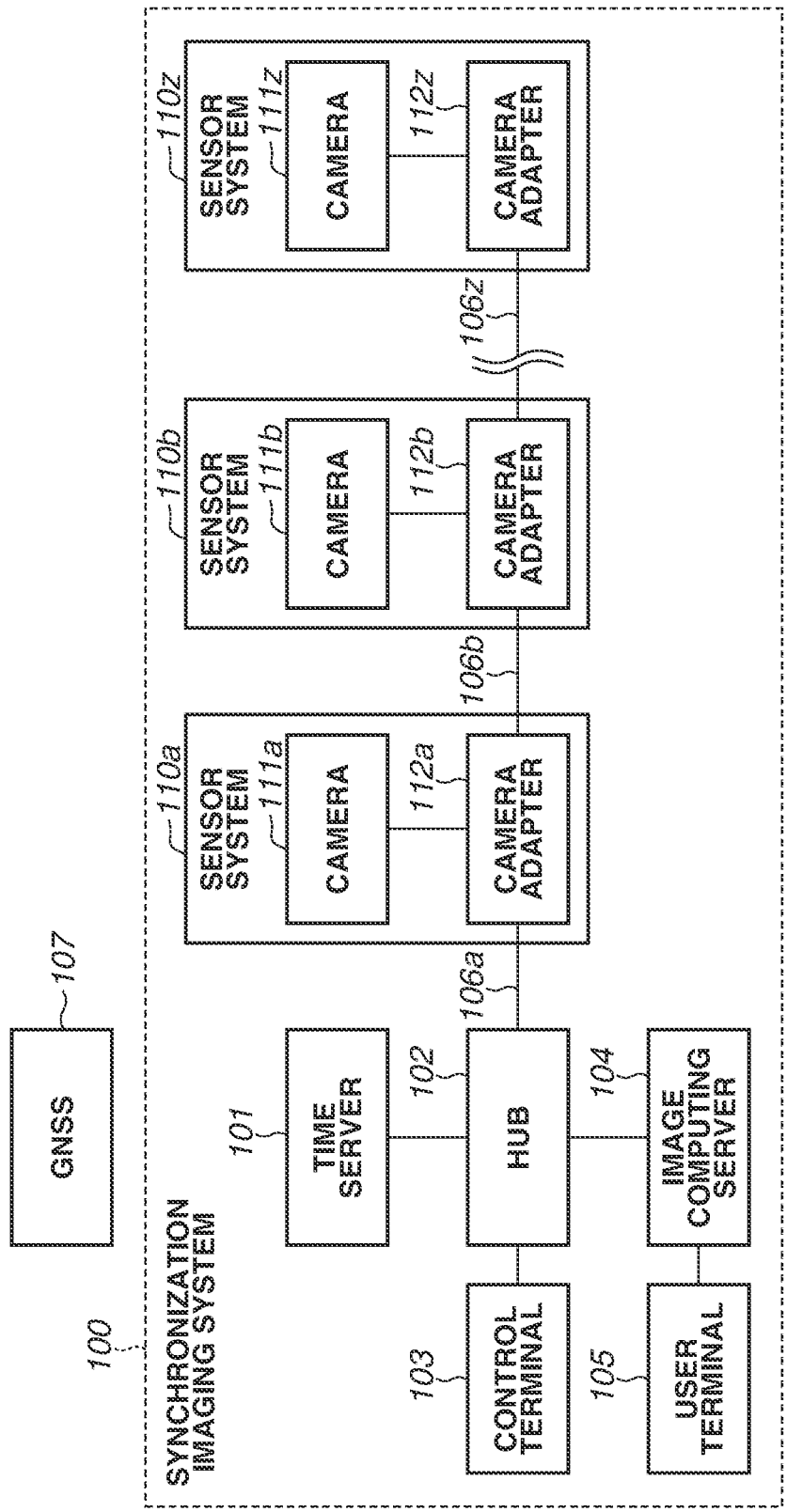
FIG. 1 is a block diagram illustrating an example of a configuration of a synchronization imaging system according to one or more aspect of the present disclosure.

FIG. 1 is a block diagram illustrating an example of a configuration of a synchronization imaging system according to a first exemplary embodiment.

A synchronization imaging system 100 in FIG. 1 performs synchronous imaging to capture images from a plurality of viewpoints using a plurality of cameras situated at different positions in, for example, a gymnastic hall, a stadium, or a concert hall and generates virtual viewpoint images using the images of the plurality of viewpoints that are captured by the synchronous imaging. With the virtual viewpoint images generated by the synchronization imaging system 100, for example, a user can view a highlight scene of a soccer or basketball game from various angles or can view a gymnastic or martial art event from desired viewpoints. At this time, the synchronization imaging system 100 uses Precision Time Protocol (PTP) to realize synchronous imaging. Then, the synchronization imaging system 100 performs PTP time synchronization processing based on timestamps of communication packets. The synchronization imaging system 100 can process still images and moving images. Unless otherwise specified, images according to the present exemplary embodiment include moving images and still images.

The synchronization imaging system 100 includes a time server 101, a hub 102, a control terminal 103, an image computing server 104, a user terminal 105, and sensor systems 110a to 110z. The hub 102 and the sensor systems 110a to 110z are connected together via daisy chains 106a to 106z.

The number of the sensor systems 110a to 110z is not limited and can be any number. Further, the sensor systems 110a to 110z need not necessarily have the same configuration. For example, models of the sensor systems 110a to 110z can be different from each other.

The time server 101 includes a function of distributing time information. The time server 101 distributes time information that is temporally synchronized with a global navigation satellite system (GNSS) 107 to the sensor systems 110a to 110z. The time server 101 can distribute a local time generated by the time server 101 as a leader time to the sensor systems 110a to 110z.

The hub 102 sorts PTP packets to which the time information distributed by the time server 101 is added based on their destinations. The hub 102 also sorts image data that the sensor systems 110a to 110z transmit to the image computing server 104 based on their destinations.

The control terminal 103 manages operational states of the blocks of the synchronization imaging system 100 via a network and controls parameter settings. The network can be an Ethernet® network based on the Institute of Electrical and Electronics Engineers (IEEE) standards such as Gigabit Ethernet (GbE) or 10 GbE or can be a combination of an Infiniband interconnect and an industrial Ethernet. The network is not limited to those described above and can be a network of another type.

The sensor systems 110a to 110z respectively include cameras 111a to 111z and camera adapters 112a to 112z. The configurations of the sensor systems 110a to 110z need not necessarily be limited to this configuration. For example, an audio device such as a microphone, a storage device such as a hard disk drive (HDD) or a solid state drive (SSD), or a pan head for controlling camera orientations can be included. Further, for example, each of the sensor systems 110a to 110z can consist of a single camera adapter and a plurality of cameras or can consist of a single camera and a plurality of camera adapters.

The sensor systems 110a to 110z are daisy-chained. With the daisy-chain connection, the number of connection cables and the power consumption of wiring operations are reduced while the amount of image data increases due to an increased resolution such as 4K or 8K of captured images and an increased frame rate. As an alternative connection form, the sensor systems 110a to 110z can be connected together in a star network configuration to transmit and receive data to and from each other via the hub 102.

Further, while all the sensor systems 110a to 110z are daisy-chained in the example illustrated in FIG. 1, the sensor systems 110a to 110z are not limited to this configuration. For example, the plurality of sensor systems 110a to 110z can be divided into several groups, and the sensor systems 110a to 110z can be daisy-chained in units of the divided groups. This configuration is effective especially in a case where the system is utilized in a stadium. For example, there may be a case where a stadium has a plurality of floors and the sensor systems 110a to 110z are placed at each floor. In this case, image data can be input to the image computing server 104 for each floor or for each half of the stadium. This increases ease of placement and flexibility of the system even in a place where it is difficult to connect all the sensor systems 110a to 110z together in a single daisy chain.

The cameras 111a to 111z images a subject from different directions from each other. While the cameras 111a to 111z having a similar configuration will be described below as an example, the cameras 111a to 111z can be different in performance or model.

The camera adapters 112a to 112z are respectively connected to the cameras 111a to 111z. The camera adapters 112a to 112z each control the corresponding camera 111, acquire captured images, provide synchronization signals, and set time settings. Further, the camera adapters 112a to 112z perform image processing on data captured by the cameras 111a to 111z, respectively.

For example, the camera adapters 112a to 112z output foreground images and background images from data captured by the cameras 111a to 111z so that virtual viewpoint images are generated based on the foreground images and the background images that are captured from a plurality of viewpoints. Part of the camera adapters 112a to 112z can output only foreground images separated from captured images while outputting no background images. Then, the camera adapters 112a to 112z transmit the data having undergone the image processing to the image computing server 104 via the daisy-chained hub 102.

At this time, the camera adapters 112a to 112z operate as a PTP follower and temporally synchronize with the time server 101 operating as a grand leader device. Further, the camera adapters 112a to 112z also operate as a PTP leader and operate as a boundary clock (BC) device that temporally synchronizes also with the other sensor systems 110a to 110z.

Alternatively, the camera adapters 112a to 112z can operate as a transparent clock (TC) device that performs time correction on PTP packets from the grand leader device and transfers the resulting PTP packets to other sensor systems 110a to 110z. Alternatively, the camera adapters 112a to 112z can operate as an ordinary clock (OC) device that only performs time synchronization using PTP packets from the grand leader device and PTP packets transferred from the other sensor systems 110a to 110z.

Alternatively, the camera adapters 112a to 112z can perform time synchronization using PTP packets from the grand leader device and PTP packets transferred from the other sensor systems 110a to 110z and can perform time correction on the PTP packets. At this time, the camera adapters 112a to 112z can operate as a TC & OC device that transfers the PTP packets having undergone the time correction to the other sensor systems 110a to 110z. Then, the camera adapters 112a to 112z provide imaging timings (control clock) to the cameras 111a to 111z using a synchronized time and/or a reference signal.

The image computing server 104 processes data acquired from the sensor systems 110a to 110z. For example, the image computing server 104 reconfigures captured data acquired from the sensor systems 110a to 110, converts data formats, and then stores the resulting data according to identifier of the cameras 111a to 111z, data type, and frame number. Then, the image computing server 104 receives designation of a viewpoint from the control terminal 103, reads corresponding captured data from stored information based on the designated viewpoint, performs rendering processing, and generates a virtual viewpoint image. At least part of the function of the image computing server 104 can be included in the control terminal 103, the sensor systems 110a to 110z, or the user terminal 105.

The user terminal 105 receives the rendered image from the image computing server 104 and provides an image of the viewpoint designated by the user operating the user terminal 105. Virtual viewpoint content can be generated by the image computing server 104 or can be generated by the control terminal 103 or the user terminal 105.

Figure 2:
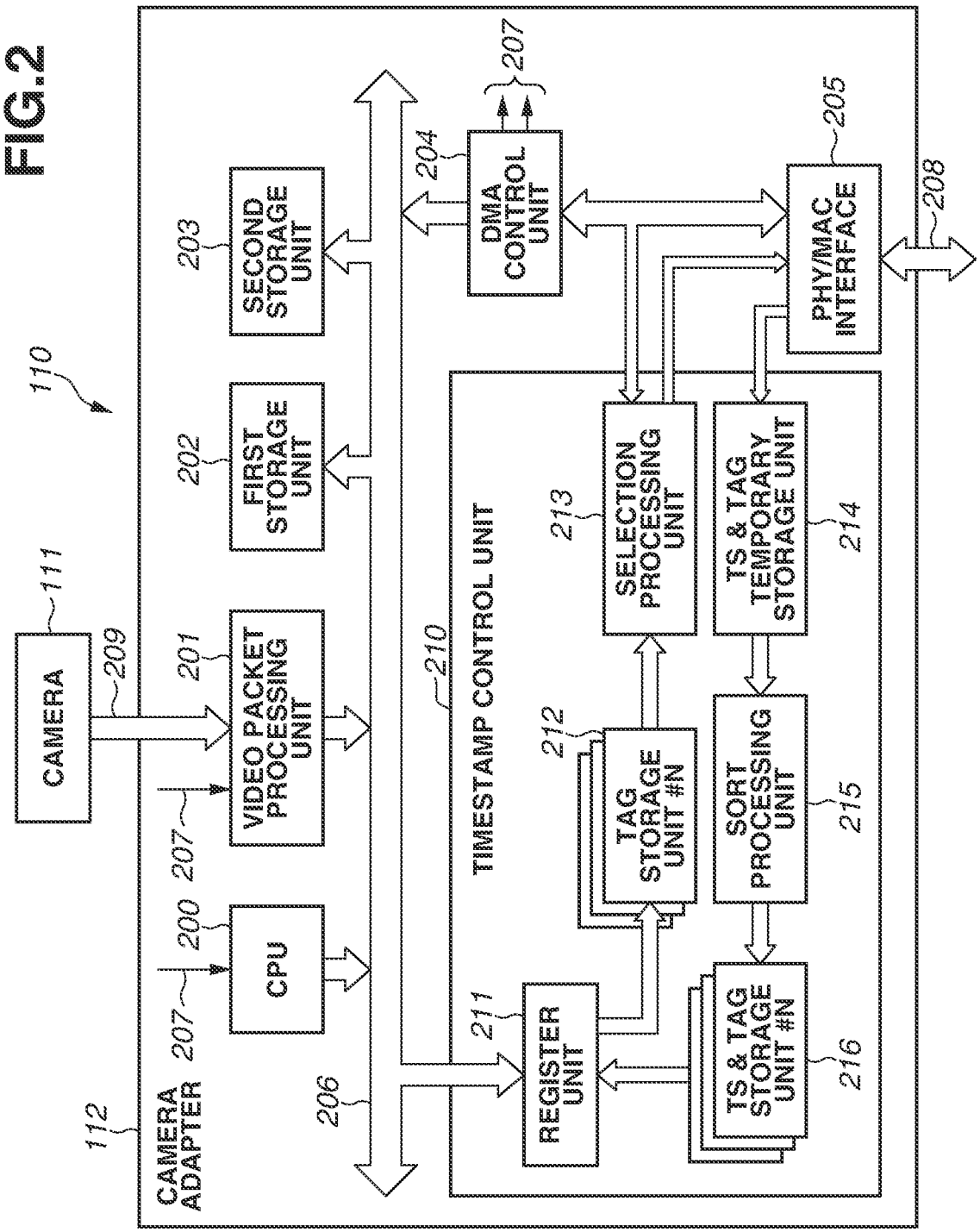
FIG. 2 is a block diagram illustrating an example of a configuration of a camera adapter according to one or more aspect of the present disclosure.

FIG. 2 is a block diagram illustrating an example of a configuration of a camera adapter 112 according to the first exemplary embodiment.

For each function realized by software among the functional blocks illustrated in FIG. 2, a program for providing the function of the functional block is stored in a memory such as a read-only memory (ROM). The program is read to a random access memory (RAM), and a central processing unit (CPU) executes the read program to realize the function. For each function realized by hardware, for example, a dedicated circuit can be generated automatically on a field programmable gate array (FPGA) based on a program for realizing the function of the functional block using a predetermined compiler. Further, a gate array circuit can be formed similarly to the FPGA to realize the function as hardware. Further, the function can be realized by an application specific integrated circuit (ASIC). The configuration of the functional blocks illustrated in FIG. 2 is a mere example, and a plurality of functional blocks can configure a single functional block, or one of the functional blocks can be divided into a plurality of blocks for performing a plurality of functions.

In FIG. 2, the sensor system 110 includes a camera 111 and a camera adapter 112. The sensor system 110 can be used as the sensor systems 110a to 110z in FIG. 1. The camera 111 can be used as the cameras 111a to 111z in FIG. 1. The camera adapter 112 can be used as the camera adapters 112a to 112z in FIG. 1.

The camera adapter 112 includes a CPU 200, a video packet processing unit 201, a first storage unit 202, a second storage unit 203, a direct memory access (DMA) control unit 204, a physical layer/media access control (PHY/MAC) interface 205, and a timestamp control unit 210. The CPU 200, the video packet processing unit 201, the first storage unit 202, the second storage unit 203, the DMA control unit 204, and the timestamp control unit 210 are connected together via a system bus 206. Further, the camera adapter 112 is connected to the camera 111 via an image transmission cable 209.

The CPU 200 executes application software on the application layer defined by the Open Systems Interconnection (OSI) reference model and controls the entire camera adapter 112. At this time, the CPU 200 stores data and programs for executing the application software in the first storage unit 202. Then, the CPU 200 reads and writes data from and to the first storage unit 202 via the system bus 206 as needed.

Specifically, the CPU 200 performs PTP stack processing, generates a descriptor for DMA transfer control using the DMA control unit 204, and generates a tag to be set to the PHY/MAC interface 205. The tag is identification information associating a communication packet that the DMA control unit 204 is requested to transmit with a timestamp output from the PHY/MAC interface 205. The CPU 200 can be a graphics processing unit (GPU).

The video packet processing unit 201 receives image data captured by the camera 111 via the image transmission cable 209 and packetizes the image data. Then, the video packet processing unit 201 generates a descriptor for DMA transfer control by using the DMA control unit 204. The function of the video packet processing unit 201 can be realized by dedicated hardware, such as an ASIC, by a CPU, or by hardware using a FPGA. The camera adapter 112 can include another CPU separately from the CPU 200 to realize the function of the video packet processing unit 201 using the other CPU.

The first storage unit 202 is a storage area for use by the CPU 200. The first storage unit 202 is constituted of a semiconductor memory such as a dynamic RAM (DRAM) or a static RAM (SRAM). An internal area of the first storage unit 202 is divided into an area for storing programs and an application buffer area for use by application software, and descriptors and tags for packet transfer are stored therein. A descriptor is information for use in packet transfer by the DMA control unit 204. A descriptor includes data transfer source address information, destination address information, and data transfer size information.

The second storage unit 203 is a storage area for use by the video packet processing unit 201. The second storage unit 203 can be constituted of a semiconductor memory such as a DRAM or a SRAM. An internal area of the second storage unit 203 stores descriptors for image packet transmission.

While the first storage unit 202 and the second storage unit 203 can respectively be occupied and used by the CPU 200 and the video packet processing unit 201, the way that the first storage unit 202 and the second storage unit 203 are used is not limited to that described above. The first storage unit 202 and the second storage unit 203 can be combined into a single storage unit, and the CPU 200 and the video packet processing unit 201 can share and use the single storage unit.

The DMA control unit 204 performs DMA transfer based on a packet transmission request from the CPU 200 or the video packet processing unit 201. At this time, the DMA control unit 204 performs DMA transfer based on the content of a descriptor generated by the CPU 200 or the video packet processing unit 201. The DMA control unit 204 includes a plurality of transmission request sections for receiving DMA transfer requests and performs priority control in units of transmission request sections. At this time, a packet transmission order is changed in units of transmission request sections. The packet transmission order does not change within each transmission request section. Then, the DMA control unit 204 notifies the CPU 200 or the video packet processing unit 201 of a completion interruption 207 corresponding to the descriptor that is used after the DMA transfer is completed.

The PHY/MAC interface 205 is an interface with a network 208 such as a local area network (LAN). The PHY/MAC interface 205 performs communication control on the PHY layer (physical layer) and the MAC layer (data link layer) in communication. Further, the PHY/MAC interface 205 outputs transmission/reception timestamps of communication packets transmitted or received to or from the network 208 and outputs tags. A timestamp is time information about a timing when the PHY/MAC interface 205 transmits or receives a packet. The timestamps are used in performing calculation for time correction of PTP protocol processing.

The timestamp control unit 210 controls output of tags associating a communication packet with a timestamp based on predetermined information readable from an interface between the DMA control unit 204 and the PHY/MAC interface 205. For example, the timestamp control unit 210 reads the predetermined information by performing a process of snooping on the interface between the DMA control unit 204 and the PHY/MAC interface 205. The predetermined information includes information that a transmission request section of the DMA control unit 204 is requested to transmit by a requester that issues a packet transmission request, a packet type of the packet transmitted by the DMA control unit 204, and a tag embedded in a header area and a data area of the transmitted packet. At this time, the CPU 200 or the video packet processing unit 201 can operate as a requester. Further, the timestamp control unit 210 inputs tags associating packets with timestamps to the PHY/MAC interface 205 in order of packets output from the DMA control unit 204.

The timestamp control unit 210 includes a register unit 211, TAG storage units #N 212, a selection processing unit 213, a TS & TAG temporary storage unit 214, a sort processing unit 215, and TS & TAG storage units #N 216.

A tag is set to the register unit 211 by the CPU 200. At this time, the tag is set to the register unit 211 before or simultaneously with a DMA transfer request from the CPU 200. Then, the CPU 200 reads a timestamp and a tag that are output from the PHY/MAC interface 205 via the register unit 211. The video packet processing unit 201 sets a tag and reads a timestamp and a tag similarly to the CPU 200. Hereinafter, the CPU 200 sets a tag and reads a timestamp and a tag.

The TAG storage units #N 212 store tags written by the CPU 200 via the register unit 211. The TAG storage units #N 212 can be constituted of a plurality of first-input fist-output (FIFO) memories. The number of the TAG storage units #N 212 that are prepared corresponds to the number of transmission request sections of the DMA control unit 204. The TAG storage units #N 212 can be used as a plurality of queues storing tags generated by requesters that issue communication packet transmission requests. At this time, each TAG storage unit #N 212 is associated with a transmission request unit.

The selection processing unit 213 controls output of tags associating communication packets with timestamps, based on the predetermined information readable from the interface that is used in transferring communication packets. At this time, the selection processing unit 213 reads the predetermined information by performing a process of snooping on a bus interface between the DMA control unit 204 and the PHY/MAC interface 205. The predetermined information includes information about a requester by which the transmission request is issued, information about the transmission request section of the DMA control unit 204 from which the transmitted packet is transmitted, packet type information about the transmitted packet, and the tag added to the transmitted packet. Then, the selection processing unit 213 selects a TAG storage unit #N 212 based on the predetermined information and outputs the tag stored in the selected TAG storage unit #N 212 to the PHY/MAC interface 205.

The TS & TAG temporary storage unit 214 temporarily stores a timestamp and a tag that are output from the PHY/MAC interface 205. The TS & TAG temporary storage unit 214 can be constituted of a FIFO memory. Then, after the timestamp and the tag are stored, the TS & TAG temporary storage unit 214 notifies the sort processing unit 215 that the timestamp information and the tag information are stored.

The sort processing unit 215 sorts timestamps and tags that are stored in the TS & TAG temporary storage unit 214 to the TS & TAG storage units #N 216. For example, the sort processing unit 215 sorts the timestamps and the tags by requester, by transmission request section to which transmission requests to the DMA control unit 204 from the requester are transmitted, by type of packets transferred by the DMA control unit 204, or based on a combination thereof. At this time, the selection processing unit 213 notifies the sort processing unit 215 of selection information about the TAG storage unit #N 212 that is selected based on the predetermined information, and the sort processing unit 215 performs sorting based on the selection information. Alternatively, the CPU 200 or the video packet processing unit 201 sets a tag including sort condition information to the register unit 211. Then, the sort processing unit 215 reads the sort condition information from the tag stored in the TS & TAG temporary storage unit 214 and performs sorting.

The TS & TAG storage units #N 216 stores timestamps and tags that are sorted by the sort processing unit 215. The TS & TAG storage units #N 216 can be constituted of a plurality of FIFO memories. The CPU 200 reads timestamps and tags that are stored in the TS & TAG storage units #N 216 via the register unit 211. The TS & TAG storage units #N 216 can be used as a plurality of queues storing timestamps and tags that are output from the PHY/MAC interface 205.

Figure 3:
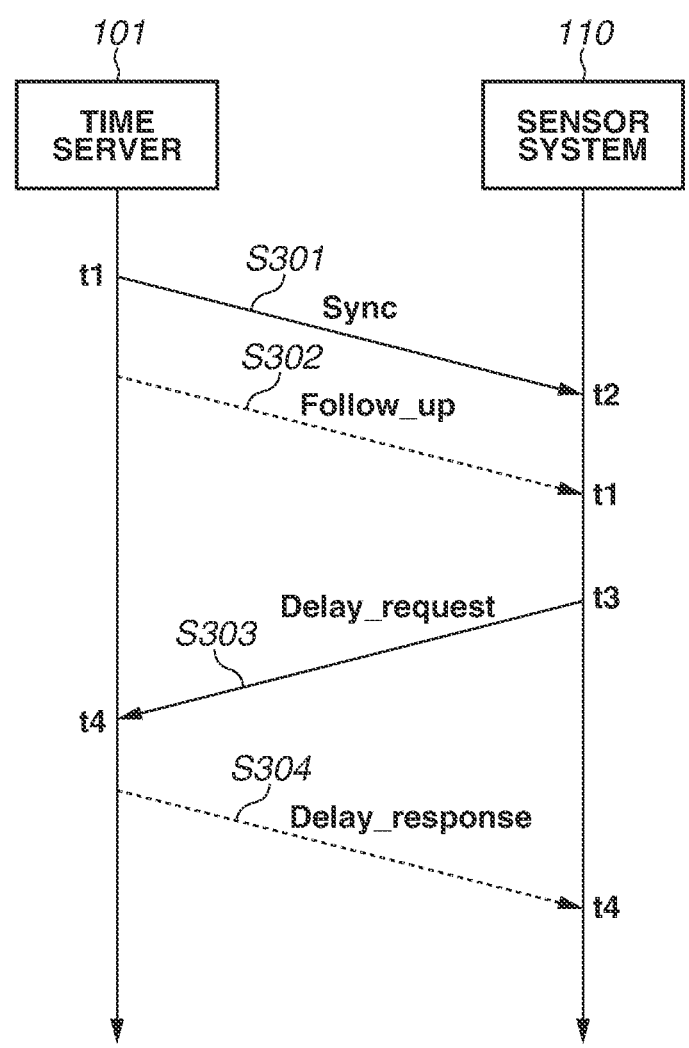
FIG. 3 is a diagram illustrating a Precision Time Protocol (PTP) time synchronization process according to one or more aspect of the present disclosure.

FIG. 3 is a diagram illustrating a process of PTP time synchronization according to the first exemplary embodiment. FIG. 3 illustrates a sequence of transmitting and receiving synchronization packets between a grand leader clock device and a PTP follower device in PTP time synchronization as an example. In this sequence, the time server 101 in FIG. 1 operates as the grand leader clock device while the sensor system 110 in FIG. 2 operates as the PTP follower device.

In step S301 in FIG. 3, the time server 101 transmits a synchronization packet Sync to the sensor system 110 at regular intervals. After transmitting the synchronization packet Sync, the time server 101 stores a transmission timestamp t1 indicating the time of the transmission. After receiving the synchronization packet Sync, the sensor system 110 stores a reception timestamp t2 indicating the time of the reception.

Next, in step S302, the time server 101 transmits the transmission timestamp t1 indicating the time of the transmission of the synchronization packet Sync in a synchronization packet Follow_Up to the sensor system 110. After receiving the synchronization packet Follow_Up, the sensor system 110 stores the transmission timestamp t1 in the synchronization packet Follow_Up. In the method illustrated in FIG. 3, the time server 101 transmits the transmission timestamp t1 of the synchronization packet Sync in the synchronization packet Follow_Up. In an alternative method, the time server 101 can transmit the transmission timestamp t1 of the synchronization packet Sync not in the synchronization packet Follow_Up but in the synchronization packet Sync.

Next, in step S303, the sensor system 110 transmits a synchronization packet Delay_Request to the time server 101. After transmitting the synchronization packet Delay_Request, the sensor system 110 stores a transmission timestamp t3 indicating the time of the transmission of the synchronization packet Delay_Request. After receiving the synchronization packet Delay_Request, the time server 101 stores a reception timestamp t4 indicating the time of the reception of the synchronization packet Delay_Request.

Next, in step S304, the time server 101 transmits a synchronization packet Delay_Response to the sensor system 110. At this time, the timeserver 101 transmits the reception timestamp t4 of the synchronization packet Delay_Request in the synchronization packet Delay_Response to the sensor system 110. After receiving the synchronization packet Delay_Response, the sensor system 110 stores the reception timestamp t4 in the synchronization packet Delay_Response.

The sensor system 110 calculates an average transmission delay time Td based on the exchange of the synchronization packets Sync, Follow_Up, Delay_Request, and Delay_Response in steps S301 to S304 and corrects the internal time of the sensor system 110. The average transmission delay time Td is given by the following formula:

$$Td=\{(t2-t1)+(t4-t3)\}/2.$$

Specifically, the sensor system 110 transmits the synchronization packet Delay_Request to the time server 101. Then, the timestamp control unit 210 in FIG. 2 stores the transmission timestamp t3 during the sequence of the PTP time synchronization processing in a predetermined TS & TAG storage unit #N 216. Then, the CPU 200 performs the PTP time synchronization process using the transmission timestamp t3.

A process of transmitting a tag to the PHY/MAC interface 205 in FIG. 2, sorting a timestamp and a tag, and performing the PTP time synchronization processing will be described below.

Figure 4:
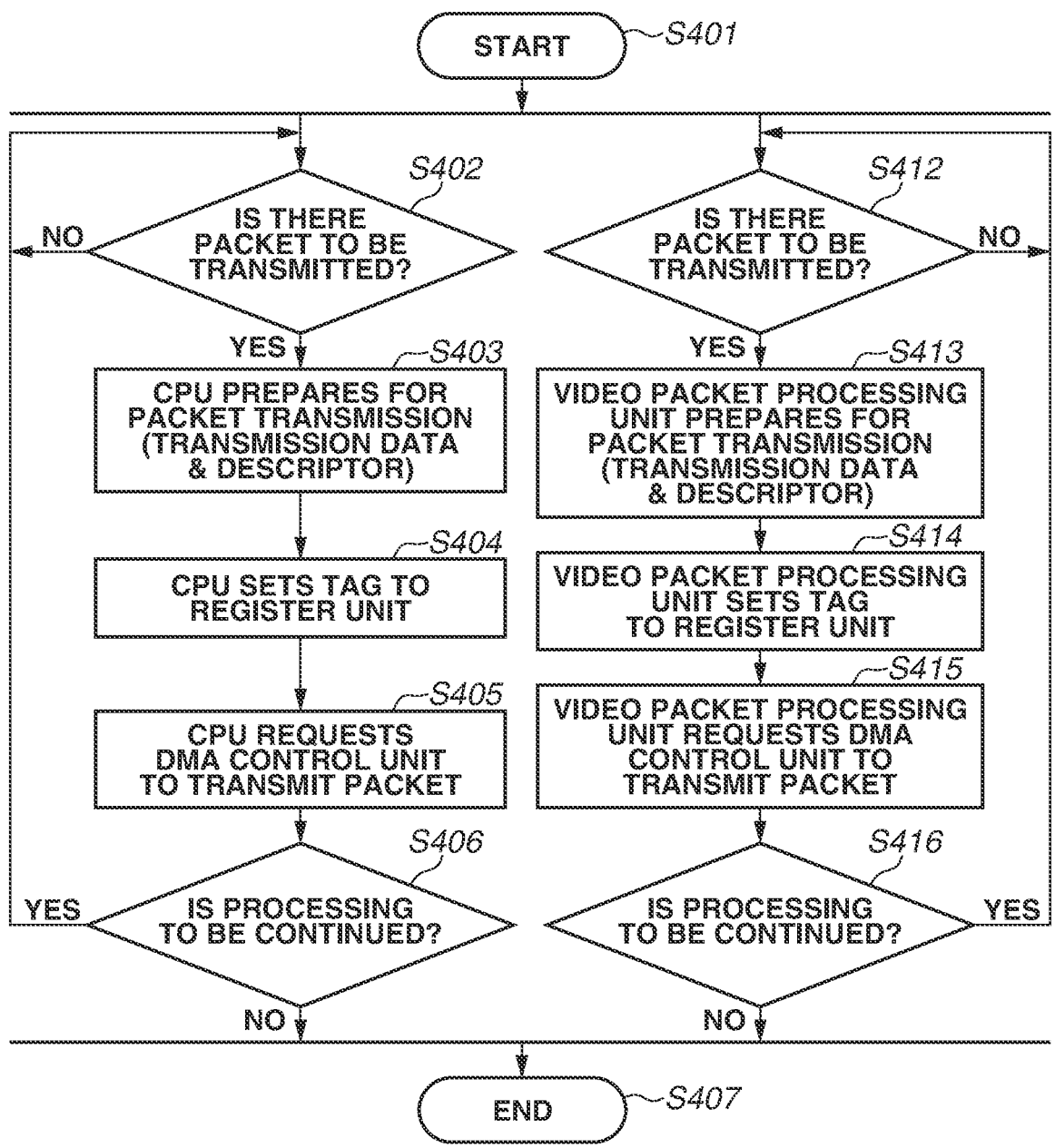
FIG. 4 is a flowchart illustrating a process of requesting packet transmission according to one or more aspect of the present disclosure.

FIG. 4 is a flowchart illustrating a process of requesting packet transmission according to the first exemplary embodiment. According to the first exemplary embodiment, a case where the CPU 200 and the video packet processing unit 201 in FIG. 2 issue a transmission request to the DMA control unit 204 and the transmission request sections of the DMA control unit 204 are used singly will be described below as an example.

Steps S402 to S406 are steps that are performed by the CPU 200, and steps S412 to S416 are steps that are performed by the video packet processing unit 201.

In step S401 in FIG. 4, the process is started after the sensor system 110 in FIG. 2 is activated.

Next, in step S402, the CPU 200 determines whether there is a packet to be transmitted. A packet to be transmitted can be, for example, a TCP/IP packet for control between the control terminal 103 and the sensor system 110 that is requested to be transmitted by an application. A packet to be transmitted can be a PTP packet for time synchronization between the time server 101 and the sensor system 110. In a case where there is a packet to be transmitted (YES in step S402), the processing proceeds to step S403. On the other hand, in a case where there is no packet to be transmitted (NO in step S402), the processing returns to step S402.

In step S403, the CPU 200 prepares for packet transmission. Specifically, the CPU 200 stores transmission data in the first storage unit 202 and generates a descriptor and a tag for use in packet transfer by the DMA control unit 204. After the CPU 200 completes the preparation for packet transmission, the processing proceeds to step S404.

In step S404, the CPU 200 sets the tag generated in step S403 to the register unit 211. Specifically, the CPU 200 writes the tag to the register unit 211 corresponding to the transmission request section of the DMA control unit 204 that the CPU 200 uses. After the CPU 200 completes the tag writing, the processing proceeds to step S405.

In step S405, the CPU 200 requests the DMA control unit 204 to transmit the packet. After the CPU 200 completes the packet transmission request, the processing proceeds to step S406.

In step S406, the CPU 200 determines whether to continue the series of processing of steps S402 to S405. At this time, in a case where a factor that ends the state of communication with external devices arises (NO in step S406), the processing proceeds to step S407. On the other hand, in a case where no factors that end the state of communication with external devices arise (YES in step S406), the processing returns to step S402.

In step S412, the video packet processing unit 201 determines whether there is a packet to be transmitted. For example, in a case where the sensor system 110 is requested to perform imaging using the camera 111 by the control terminal 103, the video packet processing unit 201 processes captured data, generates a video packet, and transmits the video packet. In a case where the video packet processing unit 201 determines that there is a packet to be transmitted (YES in step S412), the processing proceeds to step S413. On the other hand, in a case where the video packet processing unit 201 determines that there is no packet to be transmitted (NO in step S412), the processing returns to step S412.

In step S413, the video packet processing unit 201 prepares for packet transmission. Specifically, the video packet processing unit 201 stores transmission data in the second storage unit 203 and generates a descriptor and a tag for transferring the packet by the DMA control unit 204. The video packet processing unit 201 can include an internal storage unit therein and can generate the descriptor and the tag in the internal storage unit. After the video packet processing unit 201 completes the preparation for packet transmission, the processing proceeds to step S414.

In step S414, the video packet processing unit 201 sets the tag generated in step S413 to the register unit 211. Specifically, the video packet processing unit 201 writes the tag to the register unit 211 corresponding to the transmission request section of the DMA control unit 204 that the video packet processing unit 201 uses. After the video packet processing unit 201 completes the tag writing, the processing proceeds to step S415.

In step S415, the video packet processing unit 201 requests the DMA control unit 204 to transmit the packet. After the video packet processing unit 201 completes the packet transmission request, the processing proceeds to step S416.

In step S416, the video packet processing unit 201 determines whether to continue the series of processing of steps S412 to S415. At this time, in a case where a factor that ends the state of communication with external devices arises (NO in step S416), the processing proceeds to step S407. On the other hand, in a case where no factors that end the state of communication with external devices arise (YES in step S416), the processing returns to step S412.

In step S407, the process is ended. At this time, the CPU 200 and the video packet processing unit 201 do not issue a packet transmission request to the DMA control unit 204, and the sensor system 110 is changed to a non-communication state of being not in communication with external devices.

Figure 5:
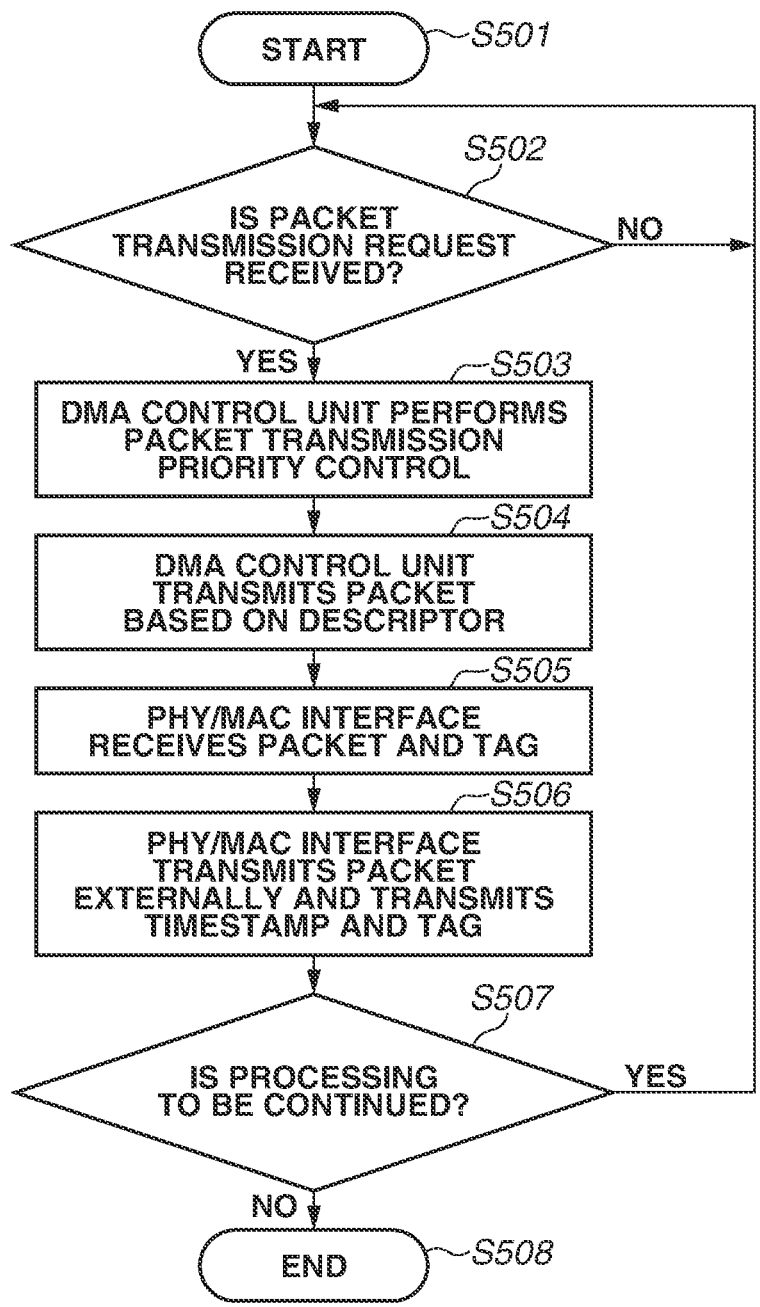
FIG. 5 is a flowchart illustrating a packet transmission process according to the first exemplary embodiment.

FIG. 5 is a flowchart illustrating a packet transmission process according to the first exemplary embodiment.

In step S501 in FIG. 5, the process is started after the sensor system 110 in FIG. 2 is activated.

Next, in step S502, the DMA control unit 204 determines whether the packet transmission request in step S405 or S415 in FIG. 4 is received. In a case where the DMA control unit 204 determines that the packet transmission request is received (YES in step S502), the processing proceeds to step S503. On the other hand, in a case where the DMA control unit 204 determines that the packet transmission request is not received (NO in step S502), the processing returns to step S502.

In step S503, the DMA control unit 204 performs packet transmission priority control. At this time, the DMA control unit 204 can include a dedicated transmission request section for the CPU 200 and another dedicated transmission request section for the video packet processing unit 201. Then, the CPU 200 issues a transmission request to the dedicated transmission request section for the CPU 200, and the video packet processing unit 201 issues a transmission request to the dedicated transmission request section for the video packet processing unit 201. The DMA control unit 204 determines a packet transmission order based on a predetermined priority control rule.

For example, a priority control rule that gives the highest priority to the transmission of video packets of the video packet processing unit 201 even in a case where the CPU 200 issues a transmission request before the video packet processing unit 201 does is set. At this time, the DMA control unit 204 transmits a video packet that is requested to be transmitted by the video packet processing unit 201 before transmitting a packet that is requested to be transmitted by the CPU 200.

Alternatively, the CPU 200 or the video packet processing unit 201 can use different transmission request sections, depending on the packet type. For example, a priority control rule can be set to prioritize the transmission of PTP packets for use in time synchronization while lowering the priority of video packets or TCP/IP packets for use in control. The above-described priority control rules are mere examples, and priority control rules are not limited to those described above. After the DMA control unit 204 determines the packet transmission order, the processing proceeds to step S504.

In step S504, the DMA control unit 204 transmits the packet to the PHY/MAC interface 205 based on the descriptor in the packet transmission order determined in step S503. After the DMA control unit 204 completes the packet transmission, the processing proceeds to step S505.

In step S505, the PHY/MAC interface 205 receives the packet transmitted from the DMA control unit 204 and receives the tag transmitted from the timestamp control unit 210 in FIG. 2. The tag transmitted from the timestamp control unit 210 to the PHY/MAC interface 205 is the tag selected by the selection processing unit 213 based on the predetermined information. After the PHY/MAC interface 205 receives the packet and the tag, the processing proceeds to step S506.

In step S506, the PHY/MAC interface 205 transmits the packet received from the DMA control unit 204 to the network 208. Then, the PHY/MAC interface 205 transmits a timestamp and a tag to the timestamp control unit 210 based on the packet transmission completion timing. After the PHY/MAC interface 205 transmits the packet to the network 208 and transmits the timestamp and the tag to the timestamp control unit 210, the processing proceeds to step S507.

In step S507, the PHY/MAC interface 205 determines whether to continue the series of processing of steps S502 to S506. In a case where a factor that ends the state of communication with external devices arises (NO in step S507), the processing proceeds to step S508. On the other hand, in a case where no factors that end the state of communication with external devices arise (YES in step S507), the processing returns to step S502.

In step S508, the processing is ended. At this time, the CPU 200 and the video packet processing unit 201 do not issue a packet transmission request to the DMA control unit 204, and the sensor system 110 is changed to a non-communication state of being not in communication with external devices.

Figure 6:
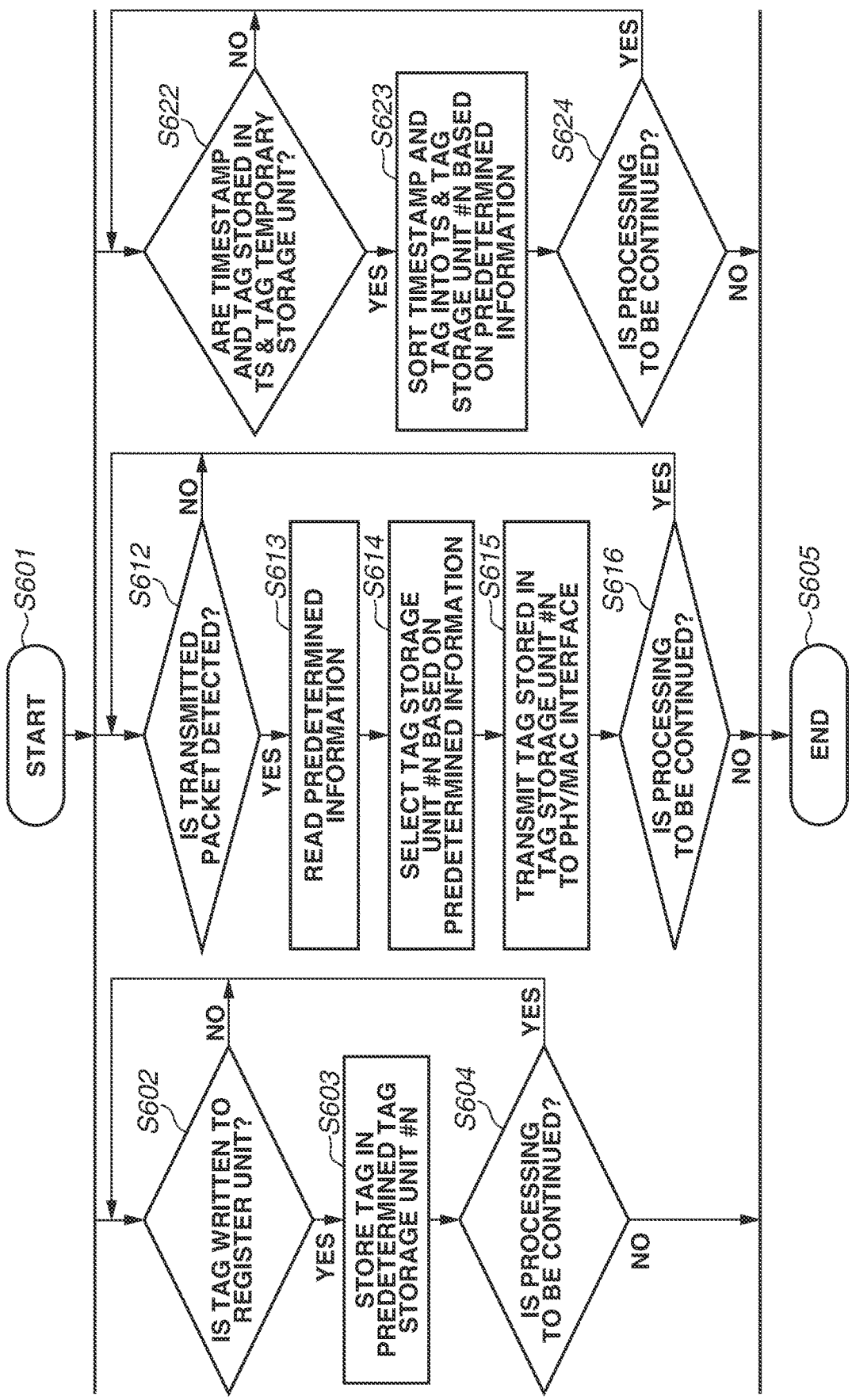
FIG. 6 is a flowchart illustrating a transmission timestamp control process according to one or more aspect of the present disclosure.

FIG. 6 is a flowchart illustrating a transmission timestamp control process according to the first exemplary embodiment.

In step S601 in FIG. 6, the process is started after the sensor system 110 in FIG. 2 is activated.

Next, in step S602, the timestamp control unit 210 determines whether a tag is written to the register unit 211 by the CPU 200 or the video packet processing unit 201 in step S402 or S412 in FIG. 4. In a case where the timestamp control unit 210 determines that a tag is written to the register unit 211 (YES in step S602), the processing proceeds to step S603. On the other hand, in a case where the register unit 211 determines that no tag is written to the register unit 211 (NO in step S602), the processing returns to step S602.

In step S603, the register unit 211 stores the tag written by the CPU 200 or the video packet processing unit 201 in the TAG storage unit #N 212. At this time, the register unit 211 stores the tag in the TAG storage unit #N 212 in units of transmission request sections of the DMA control unit 204. For example, the register unit 211 stores the tag written by the CPU 200 in the dedicated TAG storage unit 212 for the CPU 200 and stores the tag written by the video packet processing unit 201 to the dedicated TAG storage unit 212 for the video packet processing unit 201. While a case where the CPU 200 and the video packet processing unit 201 each use a single transmission request section is described as an example, the CPU 200 and the video packet processing unit 201 can use two or more transmission request sections. After the register unit 211 writes the tag to the TAG storage unit #N 212, the processing proceeds to step S604.

In step S604, the timestamp control unit 210 determines whether to continue the series of processing of steps S602 to S603. In a case where a factor that ends the state of communication with external devices arises (NO in step S604), the processing proceeds to step S605. On the other hand, in a case where no factors that end the state of communication with external devices arise (YES in step S604), the processing returns to step S602.

Further, in step S612, the selection processing unit 213 determines whether the packet transmitted from the DMA control unit 204 to the PHY/MAC interface 205 in step S504 in FIG. 5 is detected. For example, the selection processing unit 213 can detect the transmitted packet by asserting a TVALID signal defined by the Advanced eXtensible Interface (AXI) 4-STREAM. Methods for detecting packet transmission are not limited to methods that use the AXI4-STREAM interface, and any other methods can be used. In a case where the selection processing unit 213 determines that the packet is detected (YES in step S612), the processing proceeds to step S613.

In step S613, the selection processing unit 213 reads the predetermined information by performing a process of snooping on the bus interface between the DMA control unit 204 and the PHY/MAC interface 205. The predetermined information includes information about a requester by which the transmission request is issued, information about the transmission request section of the DMA control unit 204 from which the transmitted packet is transmitted, packet type information about the transmitted packet, or the tag added to the transmitted packet. After the selection processing unit 213 reads the predetermined information, the processing proceeds to step S614.

An example of a method for reading the predetermined information is a method in which the DMA control unit 204 transmits an AXI4-STREAM signal such as a TUSER signal or a TDEST signal with transmission request section information thereon and the selection processing unit 213 reads the transmission request section information by performing a process of snooping.

Alternatively, the selection processing unit 213 can read an EtherType area by performing a process of snooping on a MAC header of the packet transmitted from the DMA control unit 204. At this time, the selection processing unit 213 can determine the type of the transmission packet based on a value stored in the EtherType area.

Alternatively, the CPU 200 or the video packet processing unit 201 can embed the tag in a header area or a data area of the transmission packet. Then, the selection processing unit 213 can read the tag embedded in the header area or the data area of the transmission packet by performing a process of snooping on the communication interface between the DMA control unit 204 and the PHY/MAC interface 205. Since the tag is embedded in the header area or the data area of the transmission packet, in a case where the order of packets output from the DMA control unit 204 is changed, the order of tags is changed accordingly. Thus, the selection processing unit 213 can still read a tag associating a packet with a timestamp in the order of packets output from the DMA control unit 204 even in a case where the order of packets output from the DMA control unit 204 is changed.

Alternatively, the DMA control unit 204 can include a dedicated interface for transmitting the predetermined information. At this time, the DMA control unit 204 transmits the predetermined information directly to the selection processing unit 213 via the dedicated interface so that the selection processing unit 213 can acquire the predetermined information.

In step S614, the selection processing unit 213 selects a TAG storage unit #N 212 based on the predetermined information read in step S613. For example, the selection processing unit 213 determines from which one of the CPU 200 and the video packet processing unit 201 the packet is transmitted, based on the predetermined information read in step S613, and the selection processing unit 213 selects a TAG storage unit #N 212. Alternatively, the selection processing unit 213 can acquire packet type information from the EtherType, determine from which one of the CPU 200 and the video packet processing unit 201 the packet is transmitted, and select a TAG storage unit #N 212. After the selection processing unit 213 completes the selection of the TAG storage unit #N 212, the processing proceeds to step S615.

In step S615, the selection processing unit 213 transmits the tag stored in the TAG storage unit #N 212 selected in step S614 to the PHY/MAC interface 205. At this time, in a case where no tag is stored in the TAG storage unit #N 212 determined in step S614, the selection processing unit 213 transmits not the tag set by the CPU 200 or the video packet processing unit 201 but another tag to the PHY/MAC interface 205. After the selection processing unit 213 transmits the tag to the PHY/MAC interface 205, the processing proceeds to step S616.

In step S616, the selection processing unit 213 determines whether to continue the series of processing of steps S612 to S615. In a case where a factor that ends the state of communication with external devices arises (NO in step S616), the processing proceeds to step S605. On the other hand, in a case where no factors that end the state of communication with external devices arise (YES in step S616), the processing returns to step S612.

Further, in step S622, the TS & TAG temporary storage unit 214 temporarily stores the timestamp and the tag that are output from the PHY/MAC interface 205. Then, the TS & TAG temporary storage unit 214 notifies the sort processing unit 215 of the completion of the storage of the timestamp and the tag. After the TS & TAG temporary storage unit 214 completes the storage of the timestamp and the tag, the processing proceeds to step S623. In a case where the storage of the timestamp and the tag is not completed, the processing returns to step S622.

In step S623, the sort processing unit 215 receives the notification of the completion of the storage of the timestamp and the tag from the TS & TAG temporary storage unit 214. Then, the sort processing unit 215 sorts the timestamp and the tag stored in the TS & TAG temporary storage unit 214 to the TS & TAG storage unit #N 216 based on the predetermined information.

Specifically, the sort processing unit 215 receives the notification of the completion of the storage of the timestamp and the tag from the TS & TAG temporary storage unit 214 and receives selection information indicating the TAG storage unit #N 212 that is selected by the selection processing unit 213 based on the predetermined information. Then, the sort processing unit 215 performs sorting based on the foregoing pieces of information. Alternatively, the CPU 200 and the video packet processing unit 201 set the tag including the sort condition information to the register unit 211. Then, the sort processing unit 215 reads the sort condition information from the tag stored in the TS & TAG temporary storage unit 214 and performs sorting. After the sort processing unit 215 completes the sorting of the timestamp and the tag, the processing proceeds to step S624.

In step S624, the sort processing unit 215 determines whether to continue the series of processing of steps S622 to S623. In a case where a factor that ends the state of communication with external devices arises (NO in step S624), the processing proceeds to step S605. On the other hand, in a case where no factors that end the state of communication with external devices arise (YES in step S624), the processing returns to step S622.

In step S605, the process is ended. At this time, the CPU 200 and the video packet processing unit 201 do not issue a packet transmission request to the DMA control unit 204, and the sensor system 110 is changed to a non-communication state of being not in communication with external devices.

Figure 7:
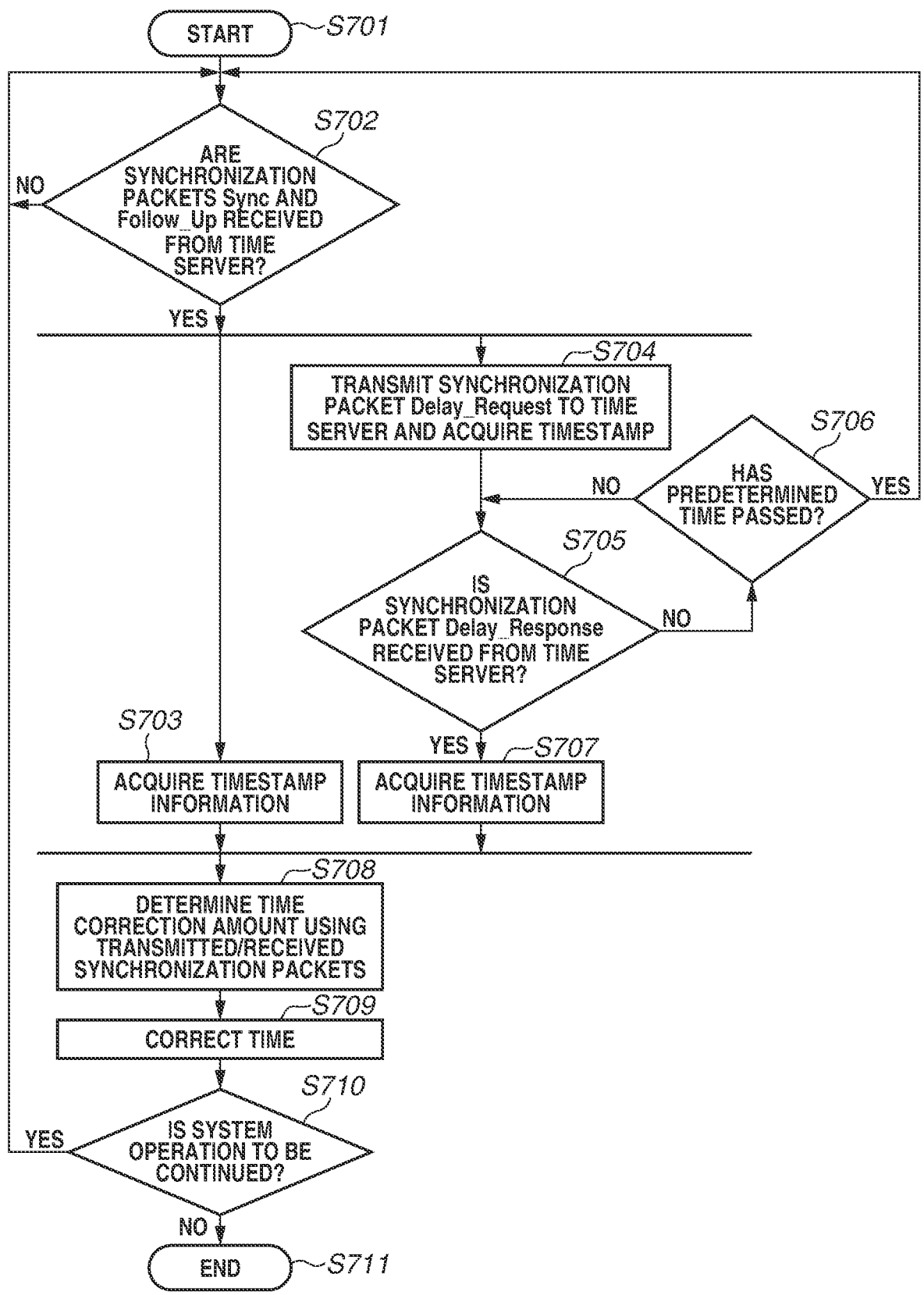
FIG. 7 is a flowchart illustrating a PTP time synchronization process according to one or more aspect of the present disclosure.

FIG. 7 is a flowchart illustrating the PTP time synchronization process according to the first exemplary embodiment. In the PTP time synchronization process, the CPU 200 uses the transmission timestamp of the synchronization packet Delay_Request sorted by the timestamp control unit 210. Then, the CPU 200 performs the PTP time synchronization process for PTP time synchronization between the time server 101 and the sensor system 110.

In step S701 in FIG. 7, the process is started after the time server 101 of the synchronization imaging system 100 in FIG. 1 is determined to be a PTP leader and the sensor system 110 in FIG. 2 is determined to be a PTP follower.

Next, in step S702, the sensor system 110 determines whether the synchronization packets Sync and Follow_Up are received from the time server 101. In a case where the sensor system 110 determines that the synchronization packets Sync and Follow_Up are received (YES in step S702), the processing proceeds to steps S703 and S704. On the other hand, in a case where the sensor system 110 determines that the synchronization packets Sync and Follow_Up are not received (NO in step S702), the processing returns to step S702.

The process of transmitting and receiving the synchronization packets Sync and Follow_Up and the PTP time synchronization process are performed by the CPU 200 or the video packet processing unit 201 of the sensor system 110. In the following description, the synchronization packet process is performed by the CPU 200.

In step S703, the CPU 200 acquires the timestamps t1 and t2 of the synchronization packets Sync and Follow_Up. After the CPU 200 completes the acquisition of the timestamps t1 and t2, the processing proceeds to step S708.

Further, in step S704, the CPU 200 transmits the synchronization packet Delay_Request to the time server 101 and acquires the timestamp 3. Specifically, the CPU 200 issues a packet transmission request to the DMA control unit 204 and sets the tag of the synchronization packet Delay_Request to the register unit 211 of the timestamp control unit 210. Then, the timestamp control unit 210 transmits the tag to the PHY/MAC interface 205. Then, the PHY/MAC interface 205 outputs the timestamp and the tag at the timing when the transmission of the synchronization packet Delay_Request is completed. Then, the timestamp control unit 210 stores the timestamp and the tag in the TS & TAG storage unit #N 216 so that the timestamp and the tag are in a state of being readable from the register unit 211. Then, the DMA control unit 204 completes the transmission of the synchronization packet Delay_Request and notifies the CPU 200 of the completion of the transmission. Then, after receiving the notification of the completion of the transmission from the DMA control unit 204, the CPU 200 checks that the tag generated at the time of requesting the packet transmission matches the tag read from the register unit 211. Then, the CPU 200 acquires the timestamp of the matched tag as the timestamp t3 of the synchronization packet Delay_Request. In a case where the CPU 200 completes the transmission of the synchronization packet Delay_Request, the processing proceeds to step S705.

In step S705, the CPU 200 determines whether the synchronization packet Delay_Response is received from the time server 101. In a case where the CPU 200 determines that the synchronization packet Delay_Response is received (YES in step S705), the processing proceeds to step S707. On the other hand, in a case where the CPU 200 determines that no synchronization packet Delay_Response is received (NO in step S705), the processing proceeds to step S706.

In step S706, the CPU 200 determines whether a predetermined time has passed without receiving the synchronization packet Delay_Response from the time server 101. In a case where the CPU 200 determines that the predetermined time has passed (YES in step S706), the processing returns to step S702. On the other hand, in a case where the CPU 200 determines that the predetermined time has not passed (NO in step S706), the processing returns to step S705.

In step S707, the CPU 200 acquires the timestamp t4 from the synchronization packet Delay_Response. At this time, the PHY/MAC interface 205 receives the synchronization packet Delay_Response transmitted from the time server 101, and the DMA control unit 204 performs DMA transfer to transfer the synchronization packet Delay_Response to the predetermined storage unit. Then, the CPU 200 acquires the timestamp t4 indicating the reception of the synchronization packet Delay_Request by the time server 101 from the synchronization packet Delay_Response. After the CPU 200 acquires the timestamp t4, the processing proceeds to step S708.

In step S708, the CPU 200 calculates the difference between the time of the time server 101 and the time of the sensor system 110 using the acquired timestamps t1 to t4 and determines a correction amount. After the CPU 200 determines the time correction amount, the processing proceeds to step S709.

In step S709, the CPU 200 corrects the time of the sensor system 110 based on the correction amount determined in step S708. The sensor system 110 is temporally synchronized with the time server 101 as a result of completing the correction processing. After the CPU 200 completes the time correction, the processing proceeds to step S710.

Meanwhile, in a case where the time is corrected by a great amount at one time, the operation of the entire sensor system 110 may become unstable. Thus, the CPU 200 can gradually correct the time over a period or can limit an amount of correction at one time.

In step S710, the sensor system 110 determines whether to continue to operate. At this time, the control terminal 103 in FIG. 1 can issue an instruction to stop the synchronization processing of all the sensor systems 110a to 110z or can issue an instruction to stop the synchronization processing of only a designated one or ones of the sensor systems 110a to 110z. In a case where the sensor system 110 determines to continue to operate (YES in step S710), the processing returns to step S702. On the other hand, in a case where the sensor system 110 determines to not continue to operate (NO in step S710), the processing proceeds to step S711. In step S711, the process is ended.

As described above, according to the first exemplary embodiment, the DMA control unit 204 may transfer communication packets to the PHY/MAC interface 205 in an order different from an order of transmission requests from the requester. At this time, the timestamp control unit 210 acquires predetermined information readable from the interface between the DMA control unit 204 and the PHY/MAC interface 205. Then, the timestamp control unit 210 controls output of a tag associating a communication packet with a timestamp, based on the predetermined information. This enables the requester to associate a timestamp output from the PHY/MAC interface 205 with a communication packet that the requester requests to transmit.

According to a second exemplary embodiment, a case where the CPU 200 in FIG. 2 issues a transmission request to the DMA control unit 204 and uses two or more transmission request sections of the DMA control unit 204 will be described as an example. The DMA control unit 204, the PHY/MAC interface 205, and the timestamp control unit 210 operate as in the first exemplary embodiment, so that redundant descriptions thereof are omitted.

Figure 8:
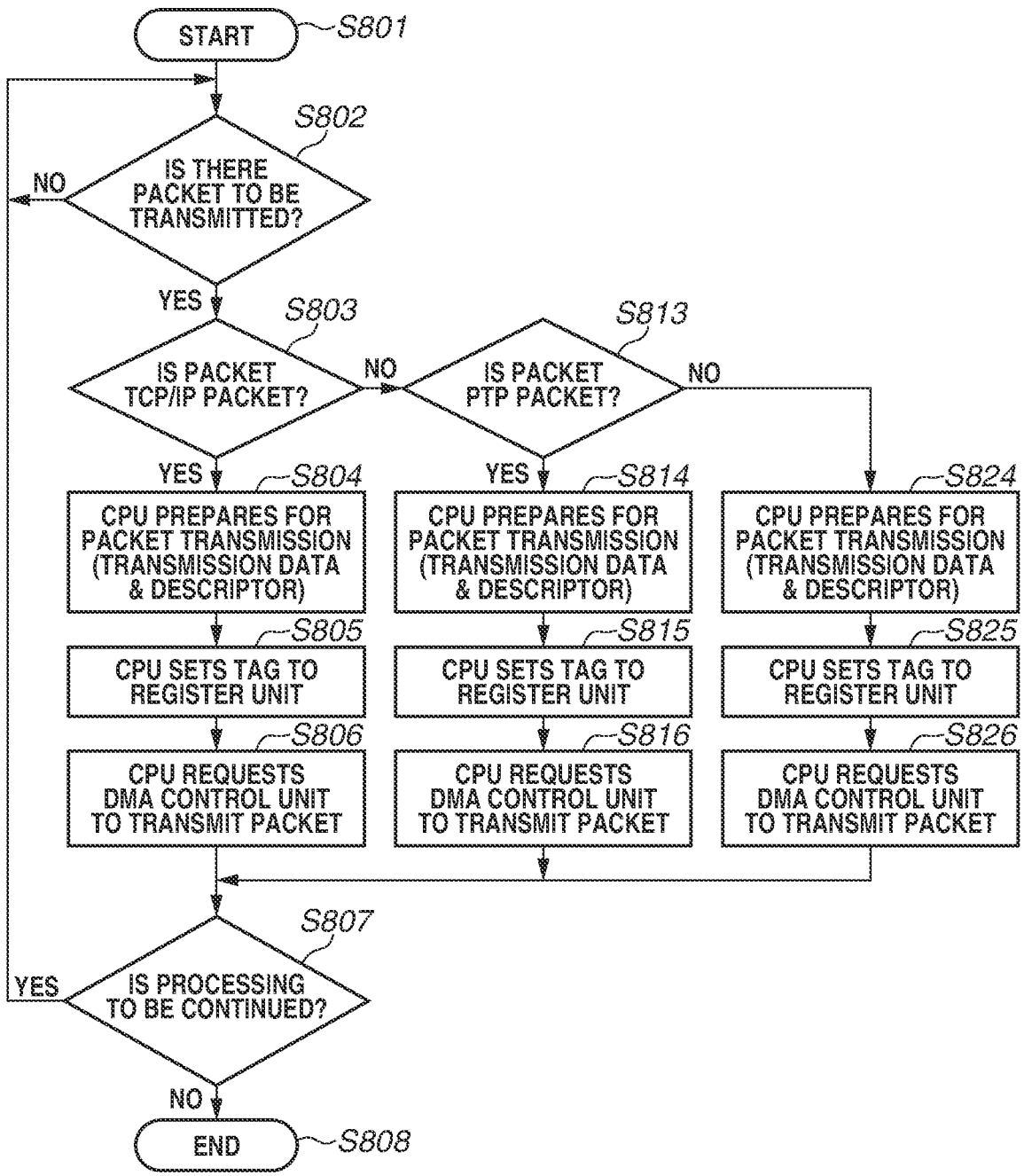
FIG. 8 is a flowchart illustrating a process of requesting packet transmission according to one or more aspect of the present disclosure.

FIG. 8 is a flowchart illustrating a process of requesting packet transmission according to the second exemplary embodiment. FIG. 8 illustrates a case where the CPU 200 issues a transmission request for each packet type to the DMA control unit 204 as an example. While a case where the packet types are TCP/IP packet, PTP packet, and other packets will be described as an example according to the second exemplary embodiment, the packet types are mere examples, and packet types are not limited to those described above.

In step S801 in FIG. 8, the process is started after the sensor system 110 is activated.

Next, in step S802, the CPU 200 determines whether there is a packet to be transmitted. A packet to be transmitted is, for example, a TCP/IP packet for control between the control terminal 103 and the sensor system 110 that is requested to be transmitted by the application. A packet to be transmitted can be a PTP packet for time synchronization between the time server 101 and the sensor system 110. In a case where the CPU 200 determines that there is a packet to be transmitted (YES in step S802), the processing proceeds to step S803. On the other hand, in a case where the CPU 200 determines that there is no packet to be transmitted (NO in step S802), the processing returns to step S802.

In step S803, the CPU 200 determines whether the packet to be transmitted in step S802 is a TCP/IP packet. In a case where the CPU 200 determines that the packet to be transmitted is a TCP/IP packet (YES in step S803), the processing proceeds to step S804. On the other hand, in a case where the CPU 200 determines that the packet to be transmitted is not a TCP/IP packet (NO in step S803), the processing proceeds to step S813.

In step S804, the CPU 200 prepares for packet transmission. Specifically, the CPU 200 stores transmission data in the first storage unit 202 and generates a descriptor and a tag for use in packet transfer by the DMA control unit 204. After the CPU 200 completes the preparation for packet transmission, the processing proceeds to step S805.

In step S805, the CPU 200 sets the tag generated in step S804 to the register unit 211. Specifically, the CPU 200 writes the tag to the register unit 211 corresponding to the transmission request sections of the DMA control unit 204 that the CPU 200 uses. For example, the CPU 200 uses three transmission request sections for transmitting TCP/IP packets, PTP packets, and other packets. Then, the CPU 200 writes each tag to the register unit 211 corresponding to the transmission request section for each packet type. After the CPU 200 completes the tag writing, the processing proceeds to step S806.

In step S806, the CPU 200 requests the DMA control unit 204 to transmit the packet. Specifically, the CPU 200 issues a transmission request to the transmission request section of the DMA control unit 204 that corresponds to the TCP/IP packet, the PTP packet, or the other packets. After the CPU 200 completes the transmission request, the processing proceeds to step S807.

In step S813, the CPU 200 determines whether the packet to be transmitted in step S802 is a PTP packet. In a case where the CPU 200 determines that the packet to be transmitted is a PTP packet (YES in step S813), the processing proceeds to step S814. On the other hand, in a case where the CPU 200 determines that the packet to be transmitted is not a PTP packet (NO in step S813), the processing proceeds to step S824.

Steps S814 to S816 correspond to steps S804 to S806, except that a process of transmitting a PTP packet is performed in steps S814 to S816. After the CPU 200 completes step S816, the processing proceeds to step S807.

Steps S824 to S826 correspond to steps S804 to S806, except that a process of transmitting a transmission packet other than TCP/IP packets and PTP packets is performed in steps S824 to S826. After the CPU 200 completes step S826, the processing proceeds to step S807.

In step S807, the CPU 200 determines whether to continue the series of processing of steps S802 to S806, steps S813 to S816, and steps S824 to S826. At this time, in a case where a factor that ends the state of communication with external devices arises (NO in step S807), the processing proceeds to step S808. On the other hand, in a case where no factors that end the state of communication with external devices arise (YES in step S807), the processing returns to step S802.

In step S808, the process is ended. At this time, the CPU 200 does not issue a packet transmission request to the DMA control unit 204, and the sensor system 110 is changed to a non-communication state of being not in communication with external devices.

As described above, according to the second exemplary embodiment, the DMA control unit 204 transfers communication packets to the PHY/MAC interface 205 in an order different from an order of transmission requests from the requester. Even in this case, the requester can use two or more transmission request sections of the DMA control unit 204 while associating a timestamp output from the PHY/MAC interface 205 with a communication packet that the requester requests to transmit.

According to a third exemplary embodiment, a case where the CPU 200 and the video packet processing unit 201 in FIG. 2 each issue a transmission request to the DMA control unit 204 and the CPU 200 and the video packet processing unit 201 each use two or more transmission request sections of the DMA control unit 204 will be described below as an example. The DMA control unit 204, the PHY/MAC interface 205, and the timestamp control unit 210 operate as in the first exemplary embodiment, so that redundant descriptions thereof are omitted.

FIG. 9 is a flowchart illustrating a process of requesting packet transmission according to the third exemplary embodiment. FIG. 9 illustrates a case where the CPU 200 and the video packet processing unit 201 each issue a transmission request for each packet type to the DMA control unit 204 as an example.

In step S901 in FIG. 9, the process is started after the sensor system 110 is activated. Steps S802 to S807, S813 to S816, and S824 to S826 in FIG. 9 are similar to those in FIG. 8, so that redundant descriptions thereof are omitted.

In step S902, the video packet processing unit 201 determines whether there is a packet to be transmitted. For example, in a case where the control terminal 103 requests the sensor system 110 to perform imaging using the camera 111, the video packet processing unit 201 processes captured data, generates a video packet, and transmits the generated video packet. The video packet processing unit 201 can process data other than captured data, generate a packet other than a video packet, and transmit the generated packet. In a case where the video packet processing unit 201 determines that there is a packet to be transmitted (YES in step S902), the processing proceeds to step S903. On the other hand, in a case where the video packet processing unit 201 determines that there is no packet to be transmitted (NO in step S902), the processing returns to step S902.

In step S903, the video packet processing unit 201 determines whether the packet to be transmitted in step S902 is a video packet. In a case where the video packet processing unit 201 determines that the packet to be transmitted is a video packet (YES in step S903), the processing proceeds to step S904. On the other hand, in a case where the video packet processing unit 201 determines that the packet to be transmitted is not a video packet (NO in step S903), the processing proceeds to step S914.

In step S904, the video packet processing unit 201 prepares for packet transmission. Specifically, the video packet processing unit 201 stores transmission data in the second storage unit 203 and generates a descriptor and a tag for use in packet transfer by the DMA control unit 204. Alternatively, the video packet processing unit 201 can include a separate internal storage unit therein and generates a descriptor and a tag in the internal storage unit. After the video packet processing unit 201 completes the preparation for packet transmission, the processing proceeds to step S905.

In step S905, the video packet processing unit 201 sets the tag generated in step S904 to the register unit 211. Specifically, the video packet processing unit 201 writes the tag to the register unit 211 corresponding to the transmission request section of the DMA control unit 204 that the video packet processing unit 201 uses. For example, the video packet processing unit 201 uses two transmission request sections for transmitting video packets or other packets. Then, the video packet processing unit 201 writes each tag to the register unit 211 corresponding to the transmission request section for each packet type. After the video packet processing unit 201 completes the tag writing, the processing proceeds to step S906.

In step S906, the video packet processing unit 201 requests the DMA control unit 204 to transmit the packet. Then, the video packet processing unit 201 issues a transmission request to the transmission request section of the DMA control unit 204 that corresponds to video packets and other communication packets. After the video packet processing unit 201 completes the transmission request, the processing proceeds to step S907.

Steps S914 to S916 correspond to steps S904 to S906, except that the video packet processing unit 201 performs a process of transmitting a communication packet other than video packets in steps S914 to S916. After the video packet processing unit 201 completes step S916, the processing proceeds to step S907.

In step S907, the video packet processing unit 201 determines whether to continue the series of processing of steps S902 to S906 and S914 to S916. At this time, in a case where a factor that ends the state of communication with external devices arises, the processing proceeds to step S908. On the other hand, in a case where no factors that end the state of communication with external devices arise, the processing returns to step S902.

In step S908, the process is ended. At this time, the video packet processing unit 201 does not issue a packet transmission request to the DMA control unit 204, and the sensor system 110 is changed to a non-communication state of being not in communication with external devices.

As described above, according to the third exemplary embodiment described above, the DMA control unit 204 transfers communication packets to the PHY/MAC interface 205 in an order different from an order of transmission requests from the plurality of requesters. In this case, each of the plurality of requesters uses two or more transmission request sections of the DMA control unit 204 while associating a timestamp output from the PHY/MAC interface 205 with a communication packet that is requested to be transmitted by the requester.

FIG. 10 is a block diagram illustrating an example of a configuration of a camera adapter according to a fourth exemplary embodiment.

In FIG. 10, a sensor system 110' includes a camera adapter 112' in place of the camera adapter 112 in FIG. 2. In the camera adapter 112', a FIFO memory 220 is added to the camera adapter 112 in FIG. 2. The FIFO memory 220 is provided between the DMA control unit 204 and the PHY/MAC interface 205. In a case where the timestamp control unit 210 is to input a tag to the PHY/MAC interface 205 simultaneously with or before the communication packet, the DMA control unit 204 stores the communication packet in the FIFO memory 220 and then inputs the tag to the PHY/MAC interface 205.

As described above, according to the fourth exemplary embodiment, the FIFO memory 220 is provided between the DMA control unit 204 and the PHY/MAC interface 205 so that the timing from the time of reading the predetermined information to the time of adding the tag to the transmission packet is adjusted.

Other Exemplary Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-124343, filed Jul. 29, 2021, which is hereby incorporated by reference herein in its entirety.

What is claimed is:

1. A communication apparatus comprising:
a memory that stores instructions; and
a processor that executes the instructions to function as:
a requester unit configured to issue a request for transmission of a packet;
a transfer unit configured to transfer the packet based on the request;
a transmission unit configured to transmit the packet transferred by the transfer unit and to output a timestamp based on the transmission of the packet; and
a control unit configured (i) read predetermined information by performing a process of snooping an interface between the transfer unit and the transmission unit, wherein the predetermined information includes at least one of (a) information indicating that a transmission request section of the transfer unit is requested to transmit, (b) a packet type of the packet transferred by the transfer unit, or (c) a tag embedded in a header area or a data area of the packet, and (ii) to control output of a tag associating the packet with the timestamp based on predetermined information.

2. The communication apparatus according to claim 1, wherein the control unit inputs the tag associating the packet with the timestamp to the transmission unit in order of the packet transferred by the transfer unit.

3. The communication apparatus according to claim 1, wherein the control unit includes:
a plurality of first queues storing a tag generated by the requester unit; and
a selection processing unit configured to select one of the plurality of first queues based on the predetermined information and to output the tag stored in the selected first queue to the transmission unit.

4. The communication apparatus according to claim 1, wherein the control unit includes:
a plurality of second queues storing the timestamp output from the transmission unit and the tag; and
a sort processing unit configured to sort the timestamp and the tag to one of the plurality of second queues based on the requester unit, based on the transmission request section to which the transmission request to the transfer unit from the requester unit is transmitted, based on the type of the packet transferred by the transfer unit, or based on a combination thereof.

5. The communication apparatus according to claim 1, further comprising a first-input first-output storage unit between the transfer unit and the transmission unit,
wherein in a case where the control unit inputs the tag to the transmission unit simultaneously with or before the packet, the transfer unit stores the packet in the storage unit and then inputs the tag to the transmission unit.

6. The communication apparatus according to claim 1, wherein the requester unit supports Precision Time Protocol (PTP).

7. A communication method comprising:
requesting transmission of a packet;
transferring the packet based on the request;
transmitting the transferred packet and outputting a timestamp based on the transmission of the packet;
reading predetermined information by performing a process of snooping an interface between the transferring and the transmitting, wherein the predetermined information includes at least one of (a) information indicating that a transmission request section of the transferring is requested to transmit, (b) a packet type of the packet transferred by the transferring, or (c) a tag embedded in a header area or a data area of the packet, and
controlling output of a tag associating the packet with the timestamp based on predetermined information.

8. A non-transitory computer-readable storage medium that stores a program for causing a computer to operate as the communication apparatus to execute a communication method, the method comprising:
requesting transmission of a packet;
transferring the packet based on the request;
transmitting the transferred packet and outputting a timestamp based on the transmission of the packet;
reading predetermined information by performing a process of snooping an interface between the transferring and the transmitting, wherein the predetermined information includes at least one of (a) information indicating that a transmission request section of the transferring is requested to transmit, (b) a packet type of the packet transferred by the transferring, or (c) a tag embedded in a header area or a data area of the packet, and
controlling output of a tag associating the packet with the timestamp based on predetermined information.

* * * * *